(12) United States Patent
Valant et al.

(10) Patent No.: US 6,843,956 B2
(45) Date of Patent: Jan. 18, 2005

US006843956B2

(54) METHOD FOR PRODUCING A CERAMIC SILVER NIOBIUM TANTALATE BODY

(75) Inventors: Matjaz Valant, Ljubljana (SI); Danilo Suvorov, Ljubljana (SI); Christian Hoffmann, Deutschlandsberg (AT); Helmut Sommariva, Graz (AT)

(73) Assignee: Epcos AG, Munich ( * ) Notice: Subject to any disclaimer, the term of this patent is extended or adjusted under 35 U.S.C. 154(b) by 0 days.

(21) Appl. No.: 10/363,075

(22) PCT Filed: Aug. 14, 2001

(86) PCT No.: PCT/DE01/03107

§ 371 (c)(1),
(2), (4) Date: Aug. 4, 2003

(87) PCT Pub. No.: WO02/18295

PCT Pub. Date: Mar. 7, 2002

(65) Prior Publication Data

US 2004/0029708 A1 Feb. 12, 2004

(30) Foreign Application Priority Data

Aug. 29, 2000 (DE) .......................................... 100 42 349

(51) Int. Cl.[7] .......................... B28B 1/00; C04B 35/495
(52) U.S. Cl. ....................... 264/669; 264/681; 501/134; 252/62.9 R
(58) Field of Search .................... 501/134; 252/62.9 R; 264/614, 669, 681

(56) References Cited

U.S. PATENT DOCUMENTS 2,864,713 A  * 12/1958 Lewis .......................... 501/134

FOREIGN PATENT DOCUMENTS

| EP | 0 916 632 A2 | 11/1998 |
|---|---|---|
| JP | 62183608 A | 8/1987 |
| JP | 01234358 A | 9/1989 |
| JP | 02239150 A | 9/1990 |
| WO | WO98/03446 | 7/1997 |

OTHER PUBLICATIONS

CAPLUS AN 2000:17317 Petzelt et al, "Infared and microwave dielectric . . . " Mar. 16, 2000.*
Valant et al, "Ag(Nb,Ta)O3–based ceramics with suppressed temperature dependence of permittivity" Journal of European Ceramic Society, 21 (15)(2001) (no month provided).*
Valant M. et al: "New High–Permittivity AgNb/sub 1–x/Ta/sub x/O/sub 3/ Microwave Ceramics: Part 1, Crystal Structures and Phase–Decomposition Relations"; Journal of the American Ceramic Society,(Jan. 1999),American Ceramic Soc. USA, Bd. 82, Nr. 1.
Wolfram, E. Gobel: "Existence Range, Structural and Dielectric Properties of . . . ", Mater Res. Bull., 16 (11), (1981)*pp. 1455–1463.
Wakino, K. et al. "Dielectric Resonator Materials and Their Applications for Mobile Communication Systems", Br. Ceram. Trans. J., 89(2)(1990,)*pp. 39–43.
Wakino, K. et al. "Microwave Characteristics . . . ", J. Am. Ceram. Soc. 67, pp. 278–281 (1984)*.
Tamura, H. et al. "Improved High–Q Dielectric Resonator with Complex Perovskite Structure", J. Am. Ceram. Soc. 67(1984)*.

* cited by examiner

*Primary Examiner*—David Brunsman
(74) *Attorney, Agent, or Firm*—Fish & Richardson P.C.

(57) ABSTRACT

A method of producing a ceramic object includes producing particles of a type A and a type B. Each particle has a dimension of at least 5 µm and each type of particle includes a ceramic material that is based on a mixture of silver oxide, niobium oxide and tantalum oxide. The method includes producing a particle mixture by mixing the types of particles, producing a green compact by compressing the particle mixture, and sintering the green compact.

9 Claims, 1 Drawing Sheet

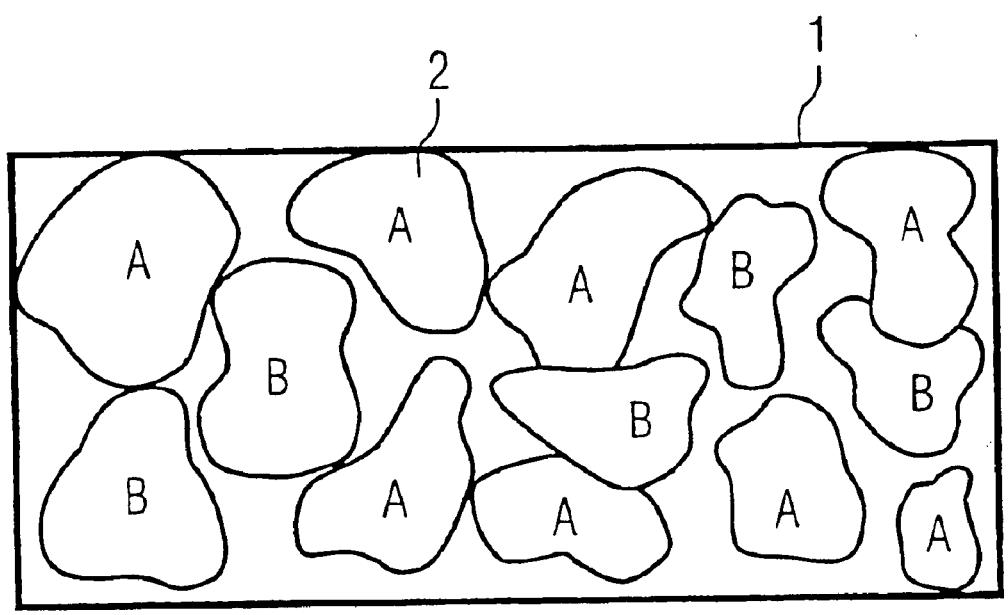

METHOD FOR PRODUCING A CERAMIC SILVER NIOBIUM TANTALATE BODY

This application claims priority to PCT Application No. PCT/DE01/03107, filed on Aug. 14, 2001, and to German Patent Application No. 100 42 349.3, filed on Aug. 29, 2000.

FIELD OF THE INVENTION

The invention relates to a method for producing a ceramic object whose composition is based on a mixture of silver oxide, niobium oxide and tantalum oxide, in which a green compact is sintered.

BACKGROUND OF THE INVENTION

A method for producing a ceramic object based on silver oxide, niobium oxide and tantalum oxide, hereinafter referred to as ANT, is known from printed publication WO 98/03446, in which small amounts of these oxides and, if applicable, other oxides are mixed together and prepared in the form of a calcined powder with a particle size of between 1 and 2 $\mu$m. This calcined powder is pressed and subsequently sintered at a temperature of between 1150° C. and 1250° C.

The known method for producing a ceramic object is disadvantageous in that it does not permit the production of a dense, phase-heterogeneous ceramic material in which two different components are present as separate phases. Due to the small size of the particles that are mixed together, a phase equilibrium can develop during sintering of the ceramic material, which then contains the various components of the ANT ceramic material in the form of a "solid solution". In particular, it does not permit the production of a dense, phase-heterogeneous ceramic material in which the individual phases exhibit different compositions of ANT.

The production of a phase-heterogeneous ceramic material based on silver, niobium and tantalum would, for example, be desirable for compensation of the temperature coefficient of the relative permittivity $\epsilon$ of a phase A with an opposing temperature coefficient of a different phase B, which exhibits a different composition from that of phase A.

SUMMARY

Thus, the objective of the present invention is to specify a method for producing a ceramic object based on ANT that permits the production of a dense, phase-heterogeneous ceramic material.

According to the invention, this objective is solved by a method in accordance with claim 1. Advantageous embodiments of the invention may be derived from the remaining claims.

The invention specifies a method for producing a ceramic object in which, in a first step, particles are produced that exhibit a dimension of at least 5 $\mu$m. The particles comprise a ceramic material based on a mixture of silver oxide, niobium oxide, and tantalum oxide. In this process, particles of a type A and a type B are produced, each of which exhibits a composition A or B of its ceramic materials, wherein the compositions A and B differ from one another. In a subsequent step, the different types of particles are mixed together, resulting in the production of a particle mixture. In a subsequent step, a green compact is produced by compressing the particle mixture. Then the green compact is sintered, which results in the creation of a ceramic object from the particle mixture.

An advantage of the method of the invention is that, due to the use of large particles, each of which corresponds only to composition A or only to composition B, the development of a "solid solution", in which all components of composition A and B would be mixed, is avoided during sintering. At the temperatures of around 1000° C. commonly used in sintering, a diffusion of the components of the particles takes place, but only across lengths of a few microns ($\mu$m). Therefore, the composition A and/or B of a large portion of the interior of the particles remains intact. Consequently, the method of the invention results in a ceramic object with a phase-heterogeneous composition.

Another advantage of the method of the invention is that, due to the use of silver oxide, niobium oxide and tantalum oxide, it permits the production of a ceramic object that features a high relative permittivity $\epsilon$>300. Consequently, the ceramic object produced with this method is suitable for use in microwave components, wherein, due to the high relative permittivity, in particular, considerable miniaturization of the exterior dimensions of the object is possible.

As both compositions are based on a mixture of silver oxide, niobium oxide and tantalum oxide, when the known powder with a particle size of 1 to 2 $\mu$m is used, a mixed ceramic material, which would possess completely new dielectric properties, would always form during sintering as a condition of equilibrium. As a result of the artificial imbalance and, therefore, the different compositions A and B being maintained, a ceramic object can be produced whose dielectric properties result from an averaging of the dielectric properties of compositions A and B.

In an advantageous embodiment of the method, the particles can be produced in a form that contains grains, wherein the grains are held together by a binder. Such particles are also known to the person skilled in the art as granules. This form of particle permits said particles to be composed of a finer powder that can be easily produced using methods commonly applied in the ceramics industry.

The particles can be especially advantageously produced from a suspension using a method comprising the following steps:

a1) Production of a calcinate of composition A or B a2) Production of grains with a particle size of up to 10 $\mu$m by grinding the calcinate a3) Production of a suspension by mixing the grains with water and a suitable binder, as well as by homogenizing the suspension.

In an advantageous embodiment, the particles can be produced from a suspension using a method with the following steps:

a31) Production of an agglomerated powder by removing the water from the suspension a32) Pressing of the agglomerated powder through a sieve.

The advantage of this method is that, as a result of the mesh width of the sieve, which, for example, can be selected to be 500 $\mu$m or larger, the dimensions of the particles can be specified.

In a further advantageous embodiment of the invention, the particles can also be produced by atomizing the suspension by means of a suitable structure in a hot-air current. Such a structure can, for example, be a jet or a tube that drips the suspension onto a rotating disk. This produces droplets whose size defines the size of the particles generated from the droplets. In the hot-air current, the water is removed from the suspension, leaving the grains bonded together by the binder to form the individual particles.

The calcinate can be especially advantageously produced in a two-stage process comprising the following steps:

a11) Production of a precursor calcinate from a mixture of oxides that contains niobium and tantalum oxide during calcination at a temperature greater than the melting temperature of silver a12) Mixing of the precursor calcinate with silver oxide a13) Calcination of the mixture.

The advantage of this two-stage process is that niobium and tantalum can be calcined at a temperature of 1300° C., as a result of which the tantalum/niobium mixture can easily be caused to react together.

In addition to silver, niobium and tantalum oxide, other oxides can be used for calcination in the production of the ceramic object. This is advantageous in that the resulting doping enables the dielectric properties of the ceramic object to be adjusted within desired parameters. Other possible oxides include, in particular, $V_2O_5$, $H_3BO_3$, $Li_2O$, $WO_3$, $Mn_2O_3$, $Bi_2O_3$, $Ga_2O_3$, or oxides of rare earth elements (RE), such as samarium, lanthanum, cerium, praseodymium, neodymium, europium, gadolinium, terbium, dysprosium, holmium, erbium, thulium, ytterbium or lutetium, each in accordance with the formula $SE_2O_3$.

It is especially advantageous to choose the compositions A and B in a suitable manner, so that the temperature coefficients of relative permittivities $TK\epsilon_A$ and $TK\epsilon_B$ of the particles exhibit different signs in a temperature interval.

The advantage of this type of method is that it allows for the production of a ceramic object whose temperature coefficient of relative permittivity is largely compensated.

In the following, the invention is described in greater detail on the basis of exemplary embodiments and the corresponding FIGURE.

BRIEF DESCRIPTION OF THE DRAWING

The FIGURE depicts, in an exemplary manner and in schematic cross-section, a ceramic object produced with the method of the invention.

DETAILED DESCRIPTION

The FIGURE depicts a ceramic object 1, which is comprised of particles 2 of a type A and a Type B. In this process, all particles 2 are based on a mixture of silver oxide, niobium oxide and tantalum oxide. The particles 2 of type A and B differ in terms of their composition of the ceramic material.

In the following, several methods are described, in an exemplary manner, with which the method of the invention can be executed. First, a general method is described, which is then described in more detail using specific examples.

Beginning with the materials niobium oxide and tantalum oxide, which are mixed together in a suitable ratio, along with additional doping substances, if applicable, deionized water is added to the oxide mixture so that a suspension with a solid matter content of 40 to 60% is formed. This suspension is homogenized in a ball mill with a volume of 2 liters, in which grinding balls with a diameter of between 10 and 20 mm are used. The processing of the suspension in the ball mill takes place for a period of between 16 and 24 hours. Following homogenization, the suspension is dried in a hot-air furnace for a period of 24 hours at a temperature of between 40° C. and 90° C. Then the resulting powder is pressed through a metal sieve with a mesh width of 500 $\mu$m. This is followed by calcination in a batch furnace using a turnover capsule made of corundum ($Al_2O_3$).

The following Table 1 shows the data for the two stages of the two-stage temperature profile used for calcination. The heating rate A is indicated in ° C./min. in the second column. The third column indicates the temperature T attained after heating. The third column depicts the holding time H. The fifth column depicts the atmosphere used.

TABLE 1

Temperature profile for the first calcination

| Stage | A [° C./min.] | T [° C.] | H [h] | Atmosphere |
|---|---|---|---|---|
| 1 | 2 ... 5 | 1100 ... 1300 | 15 ... 25 | air |
| 2 | 2 ... 5 | 25 | end | air |

The calcined powder is pressed through the metal sieve a second time and mixed with a suitable amount of silver oxide and, if applicable, other additives in the desired ratio. Then, deionized water is again added to the oxide mixture to produce a suspension with a solid matter content of 40% to 60%. Following the process already specified above, the suspension is homogenized and dried. Then, the resulting powder is again pressed through the metal sieve. This is followed by a calcination that occurs in four steps, which are depicted in Table 2 in a manner corresponding to Table 1.

TABLE 2

Temperature profile for the second calcination

| Stage | A [° C./min.] | T [° C.] | H [h] | Atmosphere |
|---|---|---|---|---|
| 1 | 3 ... 5 | 200 | 0 | air |
| 2 | 3 ... 5 | 800 ... 1100 | 10 ... 20 | $O_2$ |
| 3 | 3 ... 5 | 200 | 0 | $O_2$ |
| 4 | 3 ... 5 | 25 | end | air |

The powder produced in the second calcination process is ground in a coarse mill, after which a sufficient amount of deionized water is added to produce a suspension with a solid matter content of 60 to 70%. This suspension is ground in a ball mill with a volume of 0.5 l using zirconium grinding balls with a diameter of between 0.8 and 1.5 mm.

Table 3 depicts the values, obtained for different grinding times M, for the average particle size G of the ground powder, as well as the specific surface area O of the ground powder.

TABLE 3

Grinding time, particle size and specific surface area

| No. | M [min.] | G [$\mu$m] | O [$m^2$/g] |
|---|---|---|---|
| 1 | 5 ± 1 | 5.8 ... 6.3 | 0.3 ... 0.5 |
| 2 | 10 ± 1 | 3.3 ... 3.9 | 0.7 ... 0.9 |
| 3 | 20 ± 2 | 1.2 ... 1.8 | 1.0 ... 1.2 |
| 4 | 30 ± 2 | 0 ... 1.3 | 2.0 ... 2.2 |
| 5 | 60 ± 3 | 0 ... 0.7 | 3.2 ... 3.4 |

The powder produced as a result of the last grinding procedure is mixed with 22 to 27 wt. % of an aqueous polyethylene glycol solution (PEG20000). Ethylene glycol acts as a binder. Subsequently, the powder is granulated by pressing it through a sieve and then drying the powder. This produces granulates with a size of at least 20 $\mu$m. In the example described here, the particles of the granulates are produced by pressing the powder combined with the binder through a sieve with a mesh width of 500 $\mu$m. As a result, particles are produced with a size of between 63 and 500 $\mu$m. The particles are dried at room temperature for a period of 24 hours.

Then the particles of composition A are mixed with particles of composition B. The mixing of the particles takes place in the dried state in an asymmetric moved mixer.

The mixture of the particles is subsequently pressed and the resulting green compacts are sintered. The following table 4 depicts the individual temperature steps of the sintering process used, using the same abbreviations that were used in Table 2.

TABLE 4

Temperature/atmosphere profile for the sintering of the particle mixture

| Stage | A [° C./min.] | T [° C.] | H [h] | Atmosphere |
|---|---|---|---|---|
| 1 | 3 . . . 5 | 200 | 0 | air |
| 2 | 3 . . . 5 | 950 . . . 1150 | 1 . . . 5 | $O_2$ |
| 3 | 3 . . . 5 | 200 | 0 | $O_2$ |
| 4 | 3 . . . 5 | 25 | end | air |

In the following, the process just described will be explained in greater detail using two specific examples.

In a first example, a ceramic material of composition A is prepared from a precursor with 46.9 wt. % of $Nb_2O_5$, 52.0 wt. % of $Ta_2O_5$ and 1.1 wt. % of $V_2O_5$. In this process, the vanadium oxide is used as a sintering process material. The starting materials of the precursor are mixed at the ratios indicated. Then, a sufficient amount of deionized water is added to produce a suspension with a 50% solid matter content. This suspension is subsequently homogenized in a ball mill with a volume of 2 l, using grinding balls with a diameter of between 10 and 20 mm. The grinding process lasts 20 hours. Following homogenization of the suspension, the suspension is dried in a forced-air oven at 50° C. for a period of 24 hours. The resulting powder is pressed through a metal sieve with a mesh width of 500 μm and is subsequently calcined in a batch furnace.

The following Table 5 depicts the temperature profile of the calcination.

TABLE 5

Temperature profile for the first calcination of example 1, composition A

| Stage | A [° C./min.] | T [° C.] | H [h] | Atmosphere |
|---|---|---|---|---|
| 1 | 5 | 1200 | 20 | air |
| 2 | 5 | 25 | end | air |

The calcined powder is again pressed through the sieve described above. Subsequently, a mixture of the powder and silver oxide is produced with a weight ratio of 59.9 wt. % of powder to 41.0 wt. % of $Ag_2O$. Then, deionized water is added to the mixture to produce a suspension with a solid matter content of 50%. The suspension is homogenized in the ball mill in the manner already described above. This is followed by the drying step specified for the precursor. A subsequent pressing of the resulting powder through the metal sieve is followed by a second calcination step, whose temperature and atmosphere profiles are depicted in Table 6.

TABLE 6

Temperature/atmosphere profile for the second calcination of example 1, composition A

| Stage | A [° C./min.] | T [° C.] | H [h] | Atmosphere |
|---|---|---|---|---|
| 1 | 3 | 200 | 0 | air |
| 2 | 3 | 950 | 15 | $O_2$ |

TABLE 6-continued

Temperature/atmosphere profile for the second calcination of example 1, composition A

| Stage | A [° C./min.] | T [° C.] | H [h] | Atmosphere |
|---|---|---|---|---|
| 3 | 3 | 200 | 0 | $O_2$ |
| 4 | 3 | 25 | end | air |

The powder calcined in this manner is pulverized in a coarse mill and then mixed with distilled water to produce a suspension with a 65% solid matter content. The suspension is ground in a ball mill with a volume of 0.5 l, using zirconium grinding balls with a diameter of 1 mm. The following Table 7 depicts the outcome of this grinding process as a factor of the grinding time depicted in Table 3.

TABLE 7

Grinding time M, particle size G and specific surface area O for example 1, composition A

| No. | M [min.] | G [μm] | O [m²/g] |
|---|---|---|---|
| 1 | 5 | 6.0 | 0.4 |
| 2 | 10 | 3.6 | 0.8 |
| 3 | 20 | 1.5 | 1.1 |
| 4 | 30 | 1.0 | 2.1 |
| 5 | 60 | 0.6 | 3.3 |

The outcome of this grinding process is a ceramic material of composition A. This powder is mixed with a 24 wt. % aqueous polyethylene glycol solution, from which the particles are subsequently produced in accordance with one of the methods described above.

Then a ceramic material of composition B is produced, wherein a mixture of oxides of the following composition is used for the precursor: 45.6 wt. % of $Nb_2O_5$, 50.5 wt. % of $Ta_2O_5$, 1.1 wt. % of $V_2O_5$ and 2.8 wt. % of $Ga_2O_3$. This precursor B is now processed in precisely the same manner as was the case with the process for precursor A already described above. Following the first calcination, 59.0 wt. % of the precursor is combined with 37.9 wt. % of $Ag_2O$ and 3.1 wt. % of $Sm_2O_3$. This mixture B is subjected to the same process steps as mixture A. In particular, the first calcination corresponds in turn to that described in Table 5.

Only the temperature/atmosphere profile of the second calcination differs during the production of composition B, and it is depicted in the following Table 8.

TABLE 8

Temperature/atmosphere profile for the second calcination of mixture B from example 1

| Stage | A [° C./min.] | T [° C.] | H [h] | Atmosphere |
|---|---|---|---|---|
| 1 | 2 | 200 | 0 | air |
| 2 | 2 | 970 | 15 | $O_2$ |
| 3 | 2 | 200 | 0 | $O_2$ |
| 4 | 2 | 25 | 0 | air |

The powder calcined in this manner is again processed in accordance with the method for composition A, wherein, in particular, the results of the grinding process as a factor of grinding process correspond to those described in Table 7.

The production of particles of composition B takes place in the same manner as the production of particles of composition A, as already described above. The particles of type A and B produced in this manner are mixed together at a weight ratio of 42.5% of component A to 57.5% of component B, and the mixture produced in this manner is pressed and then sintered, using the sintering conditions described in Table 9.

TABLE 9

Temperature/atmosphere profile for the sintering of ceramic objects from example 1, mixture B

| Stage | A [° C./min.] | T [° C.] | H [h] | Atmosphere |
|---|---|---|---|---|
| 1 | 5 | 200 | 0 | air |
| 2 | 5 | 1050 | 2 | $O_2$ |
| 3 | 5 | 200 | 0 | $O_2$ |
| 4 | 5 | 25 | end | air |

In a second exemplary embodiment of the invention, a precursor comprising 45.4 wt. % of $Nb_2O_5$ and 54.6 wt. % of $Ta_2O_5$ is used for composition A. The following process steps are the same as those used in example 1, wherein, in particular, the first calcination corresponds to Table 5. Subsequently, 58.9 wt. % of the calcinate is combined with 40.1 wt. % of silver oxide and 1 wt. % of $H_3BO_3$, with the $H_3BO_3$ performing the function of a sintering process material. The further processing of this mixture into the particles of type A of exemplary embodiment 2 again corresponds to example 1, wherein, in particular, the second calcination and the grinding process are performed in accordance with Table 6 and Table 7, respectively.

To form composition B of exemplary embodiment 2, a second precursor is produced that contains a mixture of 24.5 wt. % of $Nb_2O_5$ and 75.5 wt. % of $Ta_2O_5$. The subsequent process steps to the point of first calcination correspond to those performed for composition B of exemplary embodiment 2. Subsequently, 61.5 wt. % of the calcinate is mixed with 37.5 wt. % of $Ag_2O$ and 1 wt. % of $H_3Bo_3$. This mixture is then further processed as specified in exemplary embodiment 1.

The particles of type A and B are subsequently mixed together, as already described further above, and additionally processed into a sintered object.

Due to the favorable compensation of the temperature coefficients of relative permittivity of composition A and composition B, and due to low dielectric losses, the ceramic object produced in accordance with example 1 is well suited for use as a basic object for a microwave component. To produce a microwave component, continuous holes can also be generated in the object during pressing of the powder.

The ceramic object produced in accordance with exemplary embodiment 2 exhibits high insulating resistance, due to the use of $H_3Bo_3$ as a sintering process material and due to the lack of other components besides silver oxide, niobium oxide and tantalum oxide. As a result, the object produced in accordance with example 2 is particularly suitable for use as a dielectric in capacitors.

The ceramic objects produced in accordance with example 1 and example 2 are provided with electrodes by means of electroplating, so that electrical measurements can be performed. Table 10 depicts the results of the electrical measurements for the ceramic object according to example 1 and example 2.

TABLE 10

Microwave properties of the ceramic objects produced in accordance with examples 1 and 2

| Example | $\epsilon$ | Q × f [1 GHz] | TKf [−20° C. . . . +70° C.] |
|---|---|---|---|
| 1 | 420 | 425 | 50 ppm/K |
| 2 | 362 | 539 | 74 ppm/K |

The invention is not limited to the exemplary embodiments described, but instead is defined in its most general form by claim 1.

What is claimed is:

1. A method of producing a ceramic object, comprising:
   producing particles of a type A and a type B, each particle having a dimension of at least 5 µm, each type of particle comprising a ceramic material that is based on a mixture of silver oxide, niobium oxide and tantalum oxide;
   producing a particle mixture by mixing the types of particles;
   producing a green compact by compressing the particle mixture; and
   sintering the green compact.

2. The method according to claim 1, wherein the particles comprise grains that are held together by a binder.

3. The method according to claim 2, wherein the particles are produced from a suspension, the suspension being produced by a process comprising:
   producing a calcinate of composition A or B;
   producing grains with a particle size of up to 10 µm by grinding the calcinate;
   mixing the grains with water and a binder to produce a suspension; and homogenizing the suspension.

4. The method according to claim 3, wherein the particles are produced from the suspension by a process comprising:
   producing an agglomerated powder by removing water from the suspension; and
   pressing of the agglomerated powder through a sieve.

5. The method according to claim 3, wherein the particles are produced from the suspension by atomizing the suspension in a hot-air current.

6. The method according to claim 3, wherein the calcinate is produced by a method comprising:
   producing a precursor calcinate from a mixture of oxides that contains niobium and tantalum oxide, the precursor calcinate being produced by calcination at a temperature greater than a melting temperature of silver;
   mixing of the precursor calcinate with silver oxide; and
   calcinating the mixture.

7. The method according to claim 6, wherein, in addition to silver oxide, niobium oxide, and tantalum oxide, one or more additional oxides are used to produce the calcinate.

8. The method according to claim 7, wherein $V_2O_5$, $H_3BO_3$, $Li_2O$, $WO_3$, $Mn_2O_3$, $Bi_2O_3$, $Ga_2O_3$ or oxides of rare earth elements are used as the additional oxides.

9. The method according to claim 1, wherein compositions of A and B are chosen so that temperature coefficients of permittivities $TK\epsilon_A$ and $TK\epsilon_B$ of the type A particles and the type B particles, respectively, have different signs in a temperature interval.

* * * * *